US010091852B2

(12) United States Patent
Eliason et al.

(10) Patent No.: US 10,091,852 B2
(45) Date of Patent: Oct. 2, 2018

(54) LIGHTING SYSTEM AND METHODS FOR REDUCING NOISE AT LIGHT SENSING DEVICE

(71) Applicant: Phoseon Technology, Inc., Hillsboro, OR (US)

(72) Inventors: Garth Eliason, Portland, OR (US); Doug Childers, Portland, OR (US); Gary McKenzie, Wilsonville, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 7 days.

(21) Appl. No.: 14/875,586

(22) Filed: Oct. 5, 2015

(65) Prior Publication Data

US 2016/0119996 A1 Apr. 28, 2016

Related U.S. Application Data

(60) Provisional application No. 62/068,552, filed on Oct. 24, 2014.

(51) Int. Cl.
*G01J 1/42* (2006.01)
*H05B 33/08* (2006.01)

(52) U.S. Cl.
CPC ..... *H05B 33/0851* (2013.01); *H05B 33/0803* (2013.01)

(58) Field of Classification Search
CPC ......... A61B 6/542; A61B 6/06; A61B 6/4233; A61B 6/5241; H05G 1/44
See application file for complete search history.

(56) References Cited

U.S. PATENT DOCUMENTS

| | | | | |
|---|---|---|---|---|
| 6,683,421 B1 * | 1/2004 | Kennedy | B29C 35/0288 | 315/149 |
| 7,300,175 B2 * | 11/2007 | Brukilacchio | A61N 5/062 | 362/231 |
| 7,816,638 B2 * | 10/2010 | Olson | H05B 33/0851 | 250/214.1 |
| 8,192,053 B2 * | 6/2012 | Owen | A61L 2/10 | 362/227 |
| 2004/0067025 A1 * | 4/2004 | Haraguchi | G02B 6/3636 | 385/49 |
| 2014/0328580 A1 * | 11/2014 | Childers | C03C 25/1055 | 392/411 |
| 2015/0083933 A1 * | 3/2015 | Eliason | H01L 33/06 | 250/459.1 |
| 2015/0094551 A1 * | 4/2015 | Frix | A61B 5/721 | 600/324 |

* cited by examiner

*Primary Examiner* — David Porta
*Assistant Examiner* — Mamadou Faye
(74) *Attorney, Agent, or Firm* — McCoy Russell LLP

(57) ABSTRACT

A method may comprise: supplying light energy from a light emitting device principally along a first axis; sensing the light energy with a light sensing device oriented along a second axis, wherein the second axis is oriented substantially orthogonally to the first axis; and adjusting the light energy in response to the sensed light energy. In this way, an amount of retro-reflected light incident at the light sensing device may be reduced, measurement error of the light sensing device may be reduced, and control precision and reliability of the lighting system for curing a work piece can be increased.

19 Claims, 5 Drawing Sheets

LIGHTING SYSTEM AND METHODS FOR REDUCING NOISE AT LIGHT SENSING DEVICE

CROSS REFERENCE TO RELATED APPLICATIONS

The present application claims priority to U.S. Provisional Patent Application No. 62/068,552, entitled "LOW-FEEDBACK LED POWER MONITOR SYSTEM," filed on Oct. 24, 2014, the entire contents of which are hereby incorporated by reference for all purposes.

FIELD

The present description relates to systems and methods for increasing efficiency and effectiveness of a lighting system comprising light emitting devices and a light sensing device.

BACKGROUND/SUMMARY

Curing of photosensitive surfaces involves monitoring radiant light emitted from solid-state lighting devices such as light emitting diodes (LEDs) on to the photosensitive surfaces in order to verify the operation and performance of the lighting devices. Conventionally, a lighting system includes a light sensing device such as a photodiode positioned as close as possible to the LEDs in order to detect the maximum amount of light emitted from the solid-state lighting devices. For example, the photodiode may be located directly on an array of LEDs in order to measure the emitted light intensity.

The inventors herein have recognized potential issues with the above lighting systems. Namely, the photosensitive surfaces may have reflective properties that cause an amount of light to be reflected back to the LED array and the photodiode. When light reflected from the photosensitive surface back to the LED array and the photodiode, herein referred to as retro-reflected light, is sensed by the photodiode, it causes errors in the measurement of the emitted light. Furthermore, locating the photodiode in close proximity to the LEDs, such as directly on the LED array, makes the lighting system most susceptible to retro-reflected light detection, thereby significantly reducing operation and performance of the lighting system. Further still, measurement errors caused by retro-reflected light at the photodiode can cause lighting system control problems when the control of the LED array is based on the photodiode measurements.

One approach that at least partially addresses the aforementioned issues includes a method comprising: supplying light from a light emitting device principally along a first axis; sensing the light energy with a light sensing device oriented along a second axis, wherein the second axis is oriented substantially orthogonally to the first axis; and adjusting the light energy in response to the sensed light energy.

In another example, a method may comprise: supplying light energy from a light emitting device along a first axis for curing a curable work piece; sensing the light energy via a light sensing device oriented along a second axis substantially orthogonal to the first axis; and adjusting the curing of the work piece in response to the sensed light energy.

In another example, a lighting system may comprise: a light emitting device oriented to emit light energy principally along a first axis for curing a curable work piece; a light sensing device oriented along a second axis substantially orthogonal to the first axis for measuring the light energy emitted from the light emitting device; and a controller, including non-transitory executable instructions to adjust the curing of the work piece in response to the measured light energy.

In this manner, the technical effect of reducing an amount of retro-reflected light at the light sensing device, reducing measurement error of the light sensing device, and increasing control and overall performance of the lighting system can be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
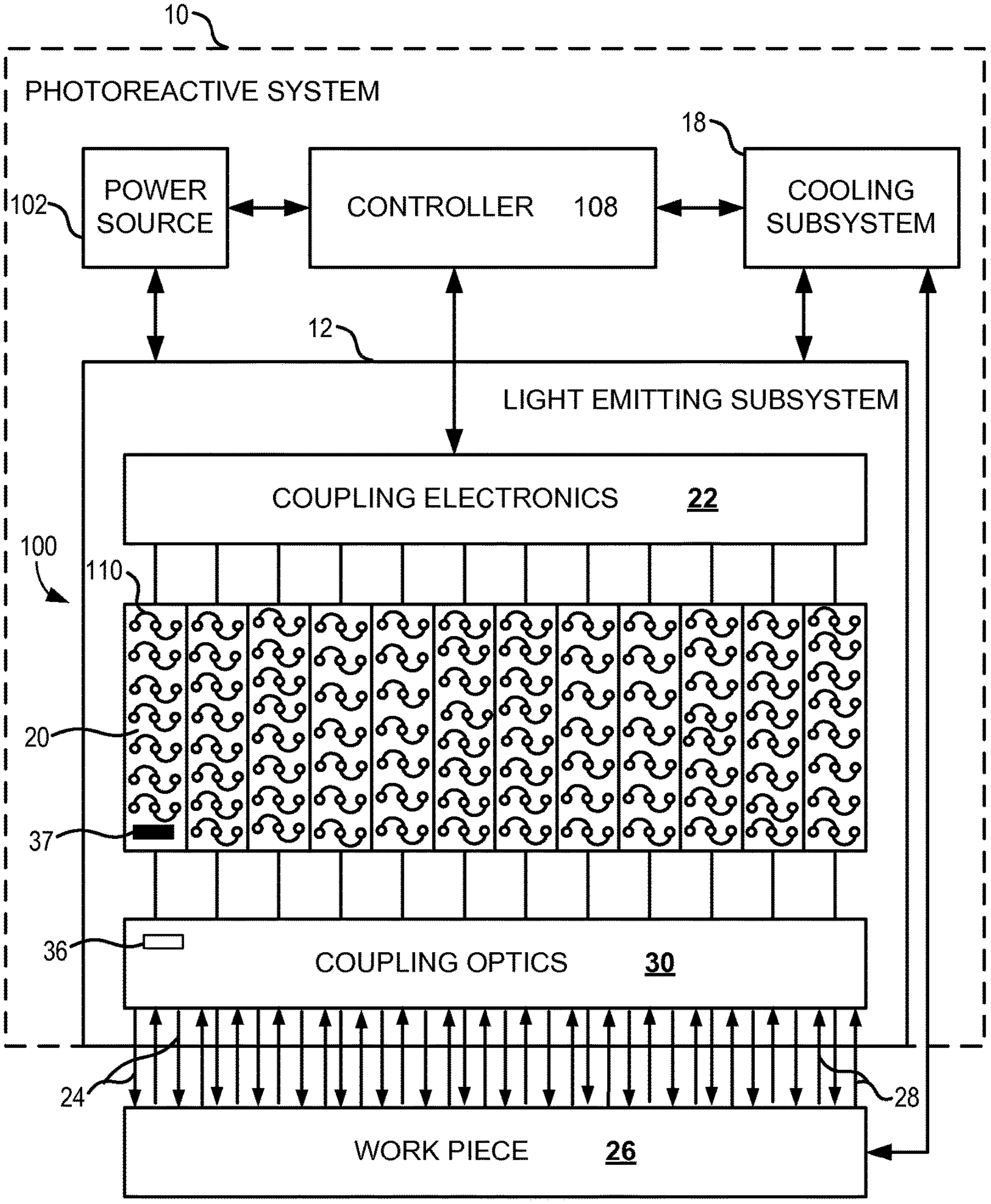
FIG. 1 shows a schematic depiction of a lighting system.
Figure 2:
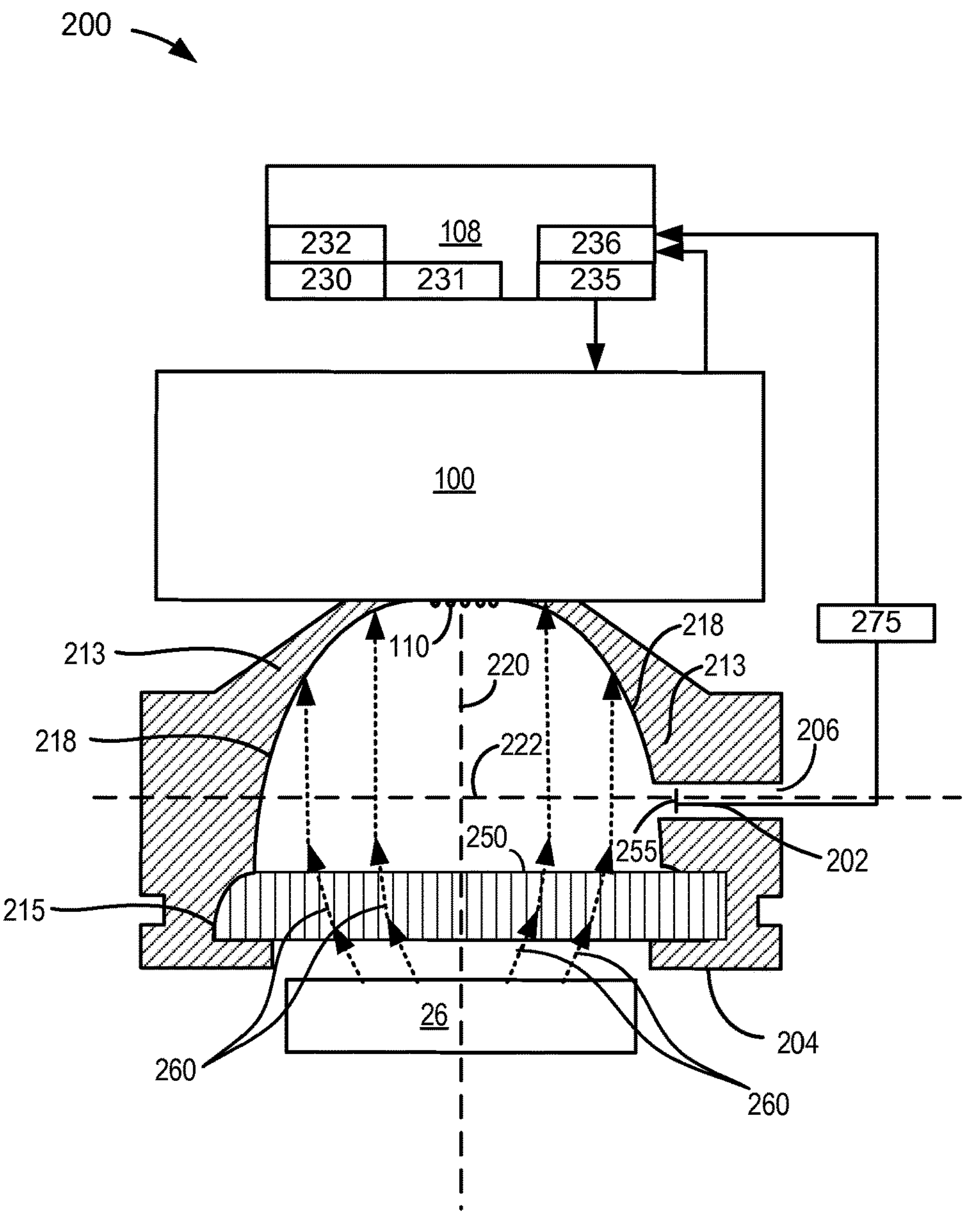
FIG. 2 shows a schematic example of a lighting system comprising a light emitting device and a light sensing device.
Figure 3:
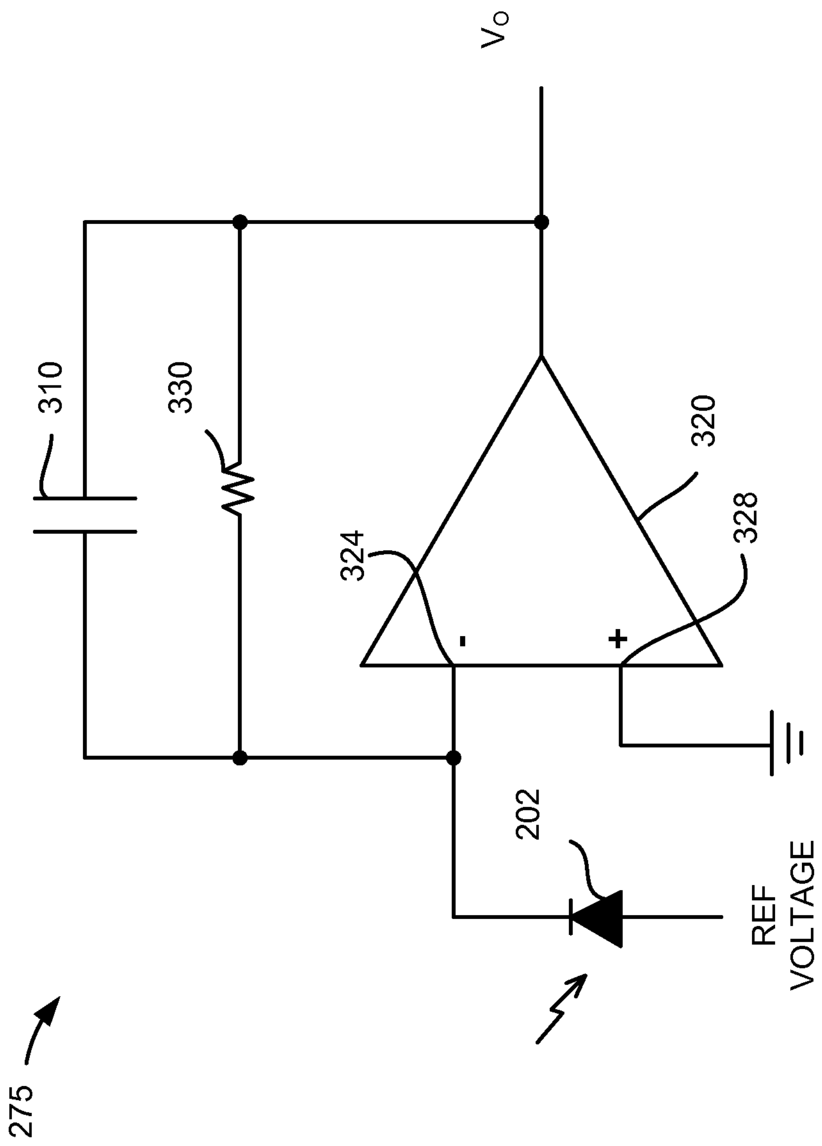
FIG. 3 shows an example circuit diagram for a transimpedance amplifier of the lighting system of FIG. 2.
Figure 4:
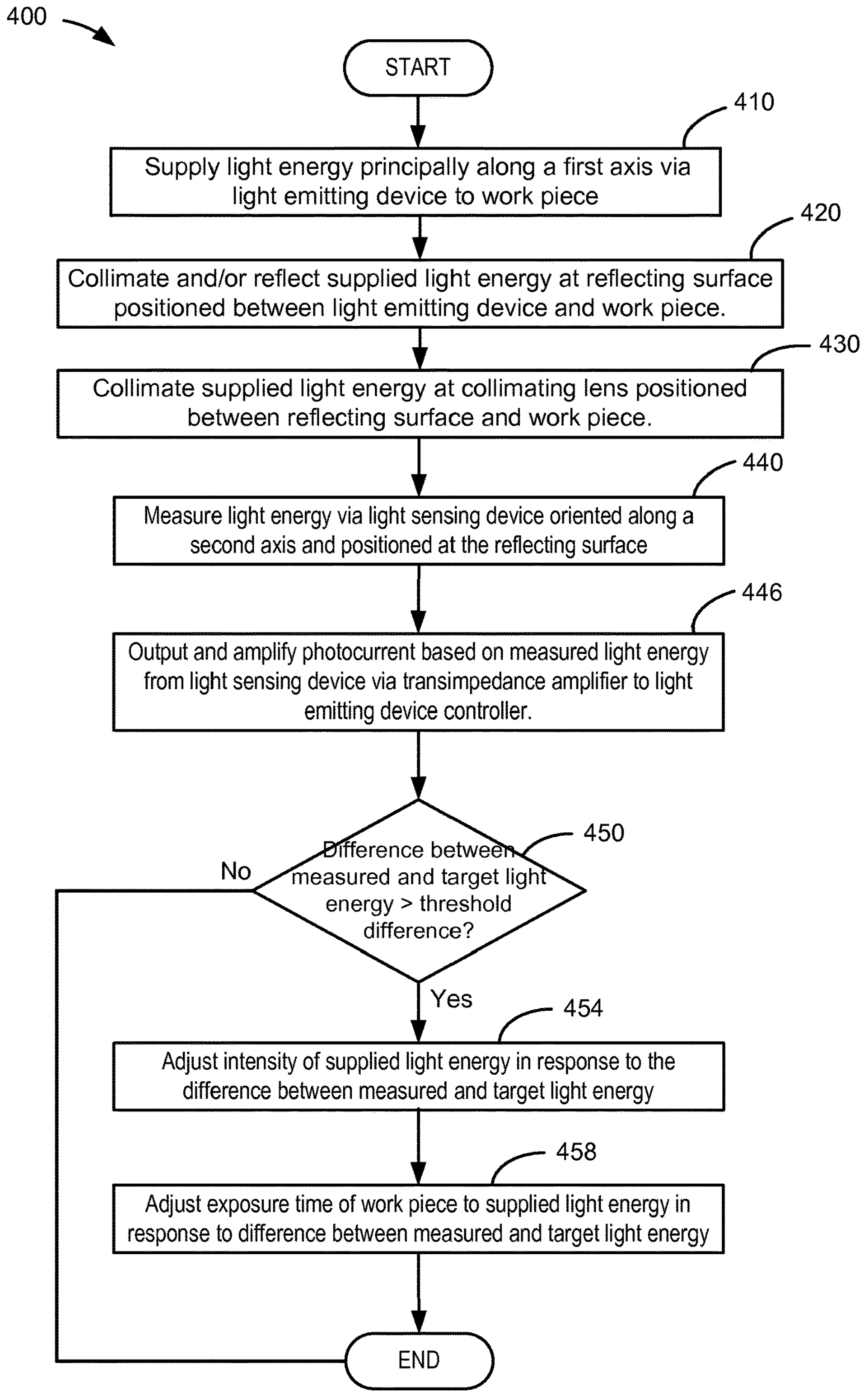
FIG. 4 shows a flow chart of an example method for operating a lighting system shown in FIG. 2.
Figure 5A:
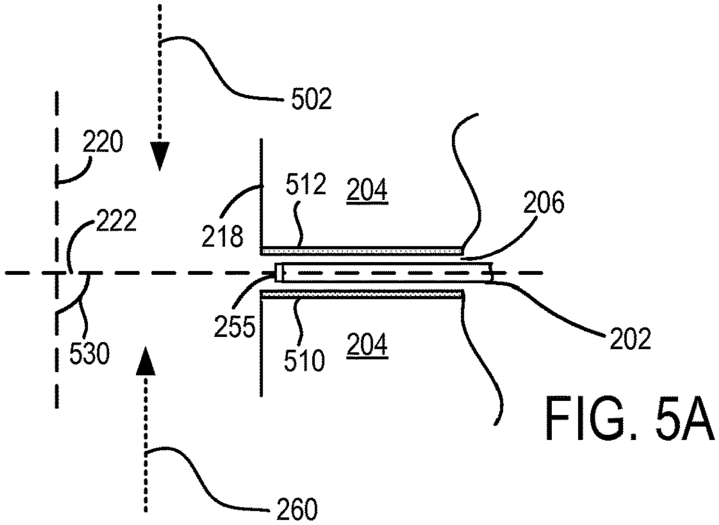
FIGS. 5A-5C show a schematic depiction of a portion of a lighting system as depicted in FIG. 2.
Figure 5B:
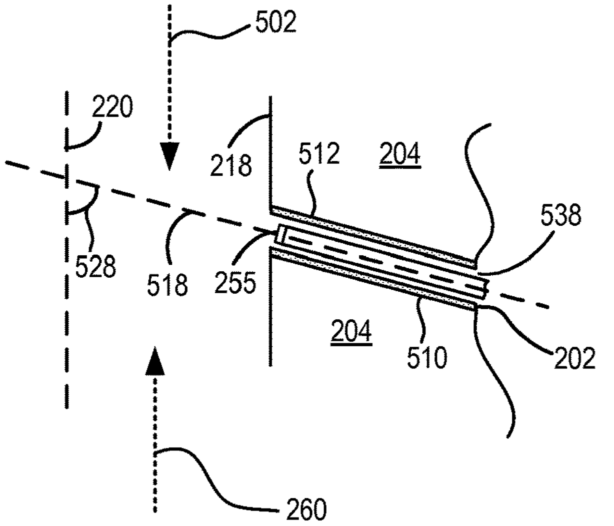
Figure 5C:
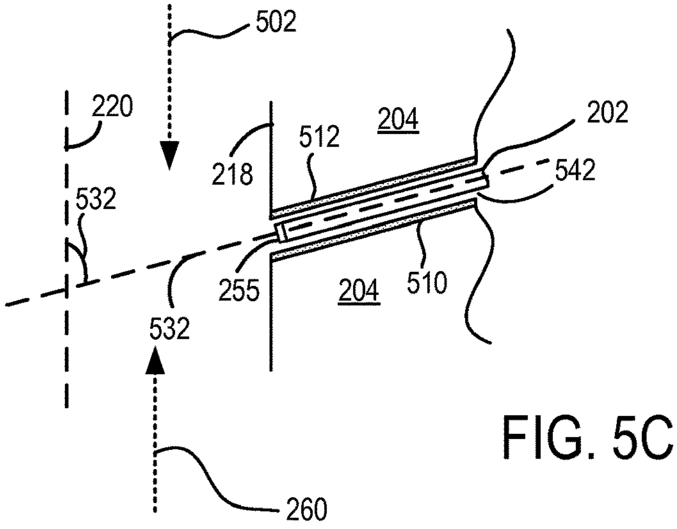

The present description is related to a method having a light emitting device, including one or more light emitting diodes (LEDs), and a light sensing device, such as a photodiode. FIG. 1 is a block diagram of a photoreactive system 10, including a light emitting subsystem 12, a controller 108, a power source 102, and a cooling subsystem 18. The photoreactive system may also include at least one light emitting device, such as an LED array 20, and at least one light sensing device having one or more light sensing surfaces. FIG. 2 shows one example of a lighting system comprising a light emitting device (e.g. LED array 20) emitting light energy principally in a direction along a first axis, and a light sensing device arranged or oriented along a second axis that is substantially orthogonal to the first axis. FIG. 3 illustrates an example circuit that monitors the photovoltaic current and applies a variable forward bias potential to a controller that supplies current to the light emitting device. FIG. 4 shows an example method of implementing the light emitting subsystem 12 described herein. FIGS. 5A-5C show a portion of the lighting system of FIG. 2.

Referring to now to FIGS. 1 and 2, the light emitting subsystem 12 may comprise one or more light emitting devices 110. Light emitting devices 110 may be light emitting diode (LED) elements, for example. Selected of the plurality of light emitting devices 110 are implemented to provide radiant output 24. The radiant output 24 is directed to a work piece 26. Returned radiation 28, such as retro-reflected light 260, may be directed back to the light emitting subsystem 12 from the work piece 26 or to a location proximal to the light emitting devices 110. Retro-reflected light 260 may refer to any light reflected back towards the light emitting device 110, and can include light reflected from work piece 26, reflective surface 218, refracting lens 250, light from sources other than light emitting device 110, and other retro-reflected light. The amount of light retro-reflected from an irradiated work piece 26 may depend on the irradiated surface characteristics of the work piece 26. For example, for irradiating more specular surfaces, retro-reflection of light back towards the light emitting device 110 will be greater than for less specular surfaces; retro-reflected light from more diffuse surfaces will tend to be more diffuse and retro-reflected light towards the light emitting device 110 may be reduced.

Individual semiconductor elements or light emitting devices 110 (e.g., LEDs) of the light emitting subsystem 12 may be controlled by controller 108. In one embodiment, controller 108 comprises an information handling system including transitory random access memory (RAM) 231, one or more processing resources such as a central processing unit (CPU) 230 or hardware or software control logic, non-transitory ROM 232, and/or other types of nonvolatile memory. Controller 108 may control a first group of one or more individual LED elements via outputs (e.g., output signals) 235, including a current control device such as a field effect transistor and/or a bi-polar transistor, to emit light of a first intensity, wavelength, and the like, while controlling a second group of one or more individual LED elements to emit light of a second different intensity, wavelength, and the like. The first group of one or more individual LED elements may be within the same array of semiconductor elements, or may be from more than one array of semiconductor elements.

The radiant output 24 may be directed to the work piece 26 via coupling optics 30. The coupling optics 30, if used, may be variously implemented. As an example, the coupling optics may include one or more layers, materials or other structure interposed between the light emitting devices 110 providing radiant output 24 and the work piece 26. As an example, the coupling optics 30 may include one or more lenses to enhance collection, condensing, collimation or otherwise the quality or effective quantity of the radiant output 24. As another example, the coupling optics 30 may include one or more reflecting surfaces such as a reflector to reflect and/or collimate a portion or all of the radiant output 24. For example, a reflecting surface 218 of a reflector 204, may be positioned between the light emitting devices 110 and the work piece 26, and may reflect and/or collimate a portion or all of the radiant output 24 toward work piece 26. Furthermore, a refracting lens 250 may be arranged at a location between a reflecting surface 218 of a reflector 204 and the work piece 26. Coupling optics 30 may further include a micro-reflector array disposed between the light emitting devices 110 and the work piece 26, and a micro-lens array disposed between the micro-reflector array and the work piece 26. In employing such micro-reflector array and such micro-lens array, each light emitting device 110 providing radiant output 24 may be disposed in a respective micro-reflector, on a one-to-one basis, and each micro-reflector may include a corresponding micro-lens. Each micro-reflector may reflect and/or collimate a portion or all of the radiant output from each of the respective light emitting devices 110, and each micro-lens may further collimate a portion or all of the radiant output from each of the respective light emitting devices 110.

One or more light sensing devices 36 may be used to monitor, sense, or measure radiant output 24 from the light emitting devices 110. As shown in FIG. 1, the light sensing device may be positioned at coupling optics 30, as further described below.

Each of the layers, materials or other structure of coupling optics 30 may have a selected index of refraction. By properly selecting each index of refraction, reflection at interfaces between layers, materials and other structure in the path of the radiant output 24 (and/or returned radiation 28) may be selectively controlled. As an example, by controlling differences in such indexes of refraction at a selected interface disposed between the semiconductor elements to the work piece 26 via the coupling optics, such as a tapered reflector, reflection at that interface may be reduced, eliminated, or minimized, so as to enhance the transmission of radiant output 24 at that interface for maximal delivery to the work piece 26.

The coupling optics 30 may be employed for various purposes. Example purposes include, among others, to protect the light emitting devices 110, to retain cooling fluid associated with the cooling subsystem 18, to collect, condense and/or collimate the radiant output 24, to collect, direct or reject returned radiation 28, or for other purposes, alone or in combination. As a further example, the photoreactive system 10 may employ coupling optics 30 so as to enhance the effective quality or quantity of the radiant output 24, particularly as delivered to the target area(s) in the work piece 26.

Selected of the plurality of light emitting devices 110 may be coupled to the controller 108 via coupling electronics 22, so as to provide data to the controller 108 containing CPU 230, ROM 232, RAM 231 and one or more inputs (e.g., input signals) 236 and outputs (e.g., output signals) 235. In one example, controller 108 may receive data from input 236, wherein input 236 may comprise data received from a transimpedance amplifier 275. In one example, the transimpedance amplifier 275 may convert a current derived from one or more light sensing devices 202 to a voltage. In one example, the controller 108 may also be implemented to control light emitting devices 110, via non-transitory executable instructions sent through one or more outputs 235. The controller 108 may also be connected to, and may be implemented to control, each of the power source 102 and the cooling subsystem 18. Moreover, the controller 108 may receive data from power source 102 and cooling subsystem 18.

The data received by the controller 108 from one or more of the power source 102, the cooling subsystem 18, and the light emitting subsystem 12 may be of various types. As an example, the data may be representative of one or more characteristics associated with coupled semiconductor elements e.g., light emitting device 110 and a light sensing device 202. As another example, the data may be representative of one or more characteristics associated with the respective cooling subsystem 18, power source 102, or cooling subsystem 18 providing the data. As still another example, the data may be representative of one or more characteristics associated with the work piece 26 (e.g., representative of the radiant output energy or spectral component(s) directed to the work piece). Moreover, the data may be representative of some combination of these characteristics.

The controller 108, in receipt of any such data, may be implemented to respond to that data. For example, responsive to data from any such component, the controller 108 may be implemented to control one or more of the power source 102, cooling subsystem 18, and light emitting subsystem 12 (including one or more such coupled semiconductor elements). As an example, responsive to data from the light sensing surface 255 of the light sensing device 202 of light emitting subsystem 12 indicating that the light energy of the radiant output 24 is insufficient at one or more points of the work piece 26, the controller 108 may be implemented to (a) increase the power source's supply of current and/or voltage to one or more of the light emitting devices 110 via one or more of outputs 235, (b) increase cooling of the light emitting subsystem 12 via the cooling subsystem 18 (e.g., because certain light emitting devices, if cooled, may provide greater radiant output), (c) increase the time during which the power is supplied to such devices via one or more of outputs 235, such as output 235, or (d) a combination of the above.

The cooling subsystem 18 is implemented to manage the thermal behavior of the light emitting subsystem 12. That is, generally, the cooling subsystem 18 provides for cooling of such light emitting subsystem 12 and, more specifically, the light emitting devices 110. The cooling subsystem 18 may also be implemented to cool the work piece 26 and/or the space between the work piece 26 and the photoreactive system 10 (e.g., particularly, the light emitting subsystem 12).

In addition, the photoreactive system 10 supports monitoring of one or more application parameters. The photoreactive system 10 may provide for monitoring of the light emitting devices 110, including their respective characteristics and specifications, via inputs and/or signals from other semiconductor elements, for example, such as light sensing devices 36 and 202. As an example, light sensing devices 36 and 202 may include a photodiode. Moreover, the photoreactive system 10 may also provide for monitoring of selected other components of the photoreactive system 10, including their respective characteristics and specifications, and may transmit this monitored data to the controller 108 via one or more inputs 236.

Providing such monitoring may aid in reliable evaluation of the operation and performance of the photoreactive system 10. For example, the photoreactive system 10 may be operating in an undesirable way with respect to one or more of the application's parameters (e.g., radiant output 24 may be too high or too low), any component characteristics associated with such parameters (e.g., input voltage and/or current supplied to light emitting devices 110), and/or any component's respective operating specifications. Operation of the photoreactive system 10 may be responsive to such monitoring, and may be carried out in accordance with the data received by controller 108 by one or more of the components of the photoreactive system 10.

In this way, monitoring also supports reliable control of the photoreactive system 10. Control strategies and control actions may be implemented via the controller 108 being responsive to data received from one or more system components. The responsive control actions may be implemented directly (e.g., by manipulating signals that directly control the component's output, based on data indicative of that component's operation) or indirectly (e.g., by controlling a component's operation through control signals directed to adjust operation of other components). For example, the light emitting device's radiant output 24 may be adjusted indirectly through control signals directed to the power source 102 that adjust power applied to the light emitting subsystem 12 and/or through control signals directed to the cooling subsystem 18 that adjust cooling applied to the light emitting subsystem 12. The aforementioned adjustments to radiant output 24 may be based on one or more signals from a light sensing device 202, such as photodiode.

The photoreactive system 10 may be used for various applications, including without limitation, curing applications ranging from ink printing to the fabrication of DVDs, and lithography. In order to accomplish the photoreaction associated with a given application, radiant output 24 may be delivered over a region or area at or near the work piece 26, at a predetermined intensity and wavelength, and for a predetermined time. For example, radiant output 24 may include UV light for curing UV-curable coatings and inks, wherein the UV light may be directed on to a surface of the work piece 26 where the curing (e.g., photoreaction) of the coatings and/or inks occurs.

In some applications, radiant output may be delivered to the work piece 26 by the light emitting subsystem 12, comprising an array of light emitting devices 110. For example, the light emitting device 110 may be one or more light emitting diode (LED) arrays. Although LED arrays may be used and are described in detail herein, it is understood that the light emitting device 110, and array(s) of same, may be implemented using other light emitting technologies without departing from the principles of the description. Examples of other light emitting technologies include, without limitation, organic LEDs, laser diodes, other semiconductor lasers. Furthermore, intensity of radiant output 24 may be adjusted by varying the intensity of the LED array, varying the number of LEDs in the array, and by using coupling optics such as micro-lenses, such as a refracting lens 250 and/or reflectors such as reflector 204, to, for example, collimate and/or focus the radiation output emitted from the LED array.

As shown in FIG. 1, the light emitting device 110 of LED array 20 may be implemented so that the LED array 20 is configured to provide radiant output 24. In one embodiment, one or more semiconductor elements, such as light sensing devices 37 including photodiodes, are provided for monitoring one or more of the array's characteristics. These light sensing devices may be selected from among the elements in the array 20 and may have the same structure as other light emitting devices 110. In other embodiments, as shown in FIGS. 1 and 2, the light sensing devices 36 and 202 may be arranged at the coupling optics 30. For example, light sensing device 202 may be integrated into a reflector housing 213 of a reflector 204, wherein the light sensing device 202 may be arranged or oriented along a second axis substantially orthogonal to a first axis along which the radiant output 24 is principally emitted by the array 20 of light emitting elements. The first axis may correspond to an optical axis of the light emitting subsystem 12. The reflector 204 may be configured to extend at least partially about the array 20 such that the radiant output 24 is at least partially collimated and reflected toward the work piece 26. In this way, the light sensing device 202 may measure radiant output of the light emitting devices 110. Principally emitting radiation output 24 along the first axis may comprise orienting the light emitting elements such that the radiant output 24 is emitted symmetrically about the first axis. Principally emitting radiation output 24 along the first axis may further comprise emitting radiant output with the highest intensity in the direction along the first axis.

Similar to light sensing devices 37, light sensing devices 36 and 202 positioned at coupling optics 30 may also receive and transmit data via coupling electronics to controller 108. For example, light sensing devices 202 may provide a reverse current signal via coupling electronics 22 (e.g., photovoltaic signal), whereas light emitting devices 110 may provide a forward current signal via coupling electronics 22 to controller 108. Furthermore, controller 108 may determine a difference between radiant output emission signals from light emitting devices 110 and the monitored radiant output signals from light sensing devices 202 by comparing the above reverse current and forward current signals.

Now referring to FIG. 2, it illustrates an example of a lighting system 200 comprising a light emitting device system 100 having one or more light emitting devices 110, coupling optics including reflector 204 and refracting lens 250, a light sensing device 202 including at least one light sensing surface 255, and controller 108. As an example, controller 108 may include non-transitory instructions residing on ROM 232 to adjust curing of the work piece 26 in response to data transmitted from the light sensing device 202. As further described below, the data transmitted from light sensing device 202 may comprise voltage potential data based on light energy sensed at light sensing surface 255 and may be processed through a transimpedance amplifier 275 before being sent to controller 108 (e.g., via inputs 236).

As described above, in one example, light emitting devices 110 may comprise light emitting diodes (LEDs). Each light emitting device 110 (e.g., LED) includes an anode and a cathode, wherein the LEDs may be configured as a single array on a substrate, multiple arrays on a substrate, several arrays (single or multiple arrays) on several substrates connected together, etc. In one example, the LED array may resemble LED array 20. In another example, the LED array 20 of light emitting devices 110 may comprise a Silicon Light Matrix™ (SLM) manufactured by Phoseon Technology, Inc. Moreover, LED array 20 may be configured to emit radiant output 24 in a direction principally along or parallel to a first axis 220. As shown in the example lighting system 200 of FIG. 2, the first axis 220 may be orthogonal to a planar surface of the work piece 26, which may aid in increasing the intensity of light directed on to the work piece 26 and may reduce the amount stray light not directed on to the work piece. In other examples, the work piece 26 may be positioned such that the first axis 220 may form an acute angle with the surface of the work piece 26, or the radiant output 24 may irradiate a non-planar surface of work piece 26, which can aid in reducing the amount of retro-reflected light incident at the light emitting device.

Coupling optics such as reflector 204 (shown in cross-section) may be provided for focusing, collimating, enhancing, directing and/or redirecting radiant output 24 produced by the LED array 20 of light emitting devices 110 to the work piece 26. In one example, the reflector 204 extends partially or completely around the light emitting devices 110. Reflector 204 may be an elliptic cylindrical reflector, parabolic reflector, dual elliptic cylindrical reflector, tapered reflector, and the like. Furthermore, the reflector 204 may comprise one of a total internal reflection (TIR) reflector, metal reflector, dielectric reflector, faceted reflector, or some combination thereof. The reflector 204 may also have the unique ability to combine radiant output of multiple wavelengths that may be emitted from multiple light emitting devices into a homogeneously mixed beam of light.

Reflector 204 may comprise a reflector housing 213 and a reflecting surface 218 of the reflector. Reflector housing 213 may aid in supporting and maintaining the shape and integrity of the reflecting surface 218, and may also provide grooves 215 (or other means such as indentations, brackets, lips, and the like) for mounting of other coupling optics such as a refracting lens 250 to the reflector housing 213. Furthermore, reflector housing 213 may comprise an opening 206 or other means for mounting a light sensing device 202 at the reflector housing 213. As shown in FIG. 2, opening 206 may be oriented along a second axis 222 that is substantially orthogonal to the first axis 220. As an example, the second axis 222 being substantially orthogonal to the first axis 220 may comprise the second axis 222 being within a threshold angle of being orthogonal to the first axis 220. In one example, being within the threshold angle of being orthogonal to the first axis 220 may comprise 10 degrees from being orthogonal to the first axis 220. Furthermore, in some examples, the second axis may be parallel to a surface of the work piece 26 irradiated by the radiant output from light emitting devices 110.

Positioning light sensing device 202 wherein the light sensing device 202 and light sensing surface 255 are angled towards the light emitting device 110 may shield (or partially shield) the light sensing device 202 and reduce an amount of incident retro-reflected light 260 at light sensing surface 255 and light sensing device 202 relative to when the light sensing device 202 and light sensing surface 255 are angled away the light emitting device 110. When the light sensing device 202 and light sensing surface 255 are angled away from the light emitting device 110, the amount of retro-reflected light 260 incident at the light sensing surface 255 and the light sensing device 202 may be increased. For example, as shown in FIG. 5B, light sensing device 202 may be angled towards the light emitting device 110 (source of radiant output 502) by constructing opening 538 and positioning light sensing device 202 along the second axis 518 at an angle 528 to the first axis 220. Angle 528 may be between 80 and 90 degrees so that second axis 518 is substantially orthogonal to the first axis 220. As another example, as shown in FIG. 5C, light sensing device 202 may be angled away from the light emitting device 110 by constructing opening 542 and positioning light sensing device 202 along the second axis 532 at an angle 532 to the first axis 220. Angle 532 may be between 90 and 110 degrees so that second axis 532 is substantially orthogonal to the first axis 220. In this way, the amount of retro-reflected light incident at light sensing surface 255 and the light sensing device 202 of FIG. 5B may be reduced relative to that of the light sensing surface 255 and the light sensing device 202 of FIG. 5C.

In one example, opening 206 may be made by drilling through the walls of reflector housing 213 along a direction parallel to the second axis 222. Dimensions of opening 206 may be just large enough to accommodate insertion of a light sensing device 202 such as a photodiode. As shown in FIG. 2, opening 206 may be positioned in the middle portion of reflector housing 213 with respect to a distance along the first axis 220 between the light emitting devices 110 and the work piece 26. By positioning opening 206 in the middle portion of reflector housing 213, an amount of retro-reflected light 260 from the work piece 26 reaching the light sensing device 202 may be reduced (e.g., as compared to the case where the opening 206 is located closer to the light emitting device 110 or closer to the work piece 26) since at that position, the retro-reflected light 260 is directed more principally in a direction along the first axis 220. The direction and distribution of the retro-reflected light may be influenced by the direction of radiant output 24 from light emitting device 110 and the characteristics of the reflector 204 and the refracting optic 250. Furthermore, the irradiated surface of work piece 26 may influence the retro-reflected light to be more or less diffuse, more or less specular, or some combination thereof, as compared to the incident radiant output 24.

In other examples, the light sensing device 202 may be mounted externally from the reflector 204. For example, light sensing device 202 may be mounted along the second axis 222 between the light emitting device 110 and the reflector 204 (or other coupling optics 30) when the light emitting device 110 is spaced from the reflector 204 (or other coupling optics 30). In another example, the light sensing device 202 may be mounted between the reflector 204 and the work piece 26 when the spacing between the reflector 204 and the work piece 26 is larger (e.g., in the case of a larger throw distance) such that positioning of the light sensing device 202 does not interfere or distort radiant output 24 from the light emitting device 110. The effective diameter of opening 206 may be dependent on being able to just accommodate the dimensions of the light sensing device 202. An opening 206 having a smaller effective diameter relative to the surface area of reflector 204 may reduce the amount of loss of light radiation incident at opening 206 (that may not be incident at light sensing device 202). In the case of an opening 206 with a non-circular cross section, an effective diameter may refer to the diameter of the circular cross section having the same cross sectional area as the non-circular opening 206.

As described above, the reflecting surface 218 of reflector 204 may be an elliptic cylindrical surface, a parabolic surface, a dual elliptic cylindrical surface, a tapered surface, and the like. Furthermore, the reflecting surface 218 reflector 204 may comprise one of a total internal reflection (TIR) surface, a metal surface, a dielectric surface, a faceted surface, or some combination thereof. The reflecting surface 218 may also have the ability to combine radiant output of multiple wavelengths that may be emitted from multiple light emitting devices into a homogeneously mixed beam of light. Reflecting surface 218 may reflect and/or collimate incident radiant output from light emitting devices 110 along the first axis 220 toward the work piece 26. Collimating incident radiant output may include partially collimating incident radiant output along the first axis 220. Furthermore, collimating radiant output along the first axis 220 toward work piece 26 may aid in reducing retro-reflected light 260 from the work piece 26 at a light sensing device 202 since the retro-reflected light 260 may be increasingly oriented in a direction parallel to the first axis 220, and decreasing oriented in a direction incident towards the light sensing device 202.

The coupling optics of lighting system 200 may further comprise a refracting lens 250 (shown in cross-section in FIG. 2). The refracting lens 250 may be arranged at a location between the reflector 204 and the work piece 26. As shown in the example of FIG. 2, refracting lens 250 may be mounted at a distal end of reflector housing 213 to light emitting devices 110. The refracting lens 250 may serve to collimate or partially collimate the light from light emitting device 110 and reflector 204, and may comprise various types of lenses including a toroidal (including cylindrical) lens, spherical lens, aspherical lens, Fresnel lens, gradient index (GRIN) lens, and the like. Furthermore, the refracting lens 250 may be arranged as one or more arrays of lens elements. The refracting lens 250 may enable collimation of at least a portion of the radiation output from the light emitting devices 110 so that the radiation output is oriented principally in a direction parallel to the first axis 220. In this way, both the radiation output intensity incident at the work piece 26 and the resultant curing of work piece 26 may have increased uniformity. Furthermore, refracting lens 250 may also advantageously collimate retro-reflected light 260 from work piece 26, thereby orienting the retro-reflected light 260 principally in a direction parallel to the first axis 220 back towards the light emitting devices 110. In this way, an amount of retro-reflected light 260 incident at a light sensing surface 255 of the light sensing device 202 may be further reduced.

As shown in FIG. 2, light sensing device 202 may be positioned within opening 206 of reflector housing 213, and arranged or oriented along a second axis substantially orthogonal to the first axis. The first axis may correspond to an optical axis of the lighting system 200. For example, one or more of the refracting lens 250, reflector 204 and light emitting devices 110 may exhibit rotational symmetry about the first axis 220. As described above, the second axis being substantially orthogonal to the first axis may comprise the second axis being within 10 degrees of being orthogonal to the first axis. Light sensing surface 255 of light sensing device 202 may be positioned to be flush with the reflecting surface 218 of the reflector 204 or light sensing surface may be positioned to be slightly recessed in opening 206 from the reflecting surface 218. When light sensing surface 255 is positioned flush with the reflecting surface 218, a sensing of radiation output emitted from light emitting devices 110 at light sensing surface 255 may be higher however an intensity of retro-reflected light 260 from work piece 26 at light sensing surface 255 may also be higher; when light sensing surface 255 is positioned recessed from the reflecting surface 218, a sensing of radiation output emitted from light emitting devices 110 at light sensing surface 255 may be lower however an intensity of retro-reflected light 260 from work piece 26 at light sensing surface 255 may also be lower. Furthermore, when light sensing surface 255 is positioned recessed from the reflecting surface 218, optical loss or distortion of the radiant output 24 may be reduced. As an example, light sensing surface 255 may comprise an optically transparent window or optical fiber connection that faces toward the interior of reflector 204 and transmits incident light at light sensing surface 255 to a photosensitive portion of the light sensing device 202.

As shown in FIGS. 5A-5C, the amount of radiant output 24 (e.g., direct source light) from light emitting device 110 incident at the light sensing device 202 may be increased by including a highly reflective surface 510 at the surface of opening 206, 538, or 542 distal to the light emitting device 110. As such, radiant output 24 from light emitting device 110 incident at highly reflective surface 510 may be reflected on to light sensing device 202. Furthermore, an amount of retro-reflected light 260 may be reduced by including a light-absorptive surface 512 at the surface of opening 206, 538, or 542 proximal to the light emitting device 110. As such, an amount of retro-reflected light 260 incident at light-absorptive surface 512 may be absorbed and not reflected on to light sensing device 202. Light-absorptive surface 512 may also comprise a baffled surface. In this case, an amount of retro-reflected light 260 incident at light-absorptive surface 512 may be dispersed and/or absorbed by the baffles and not reflected on to light sensing device 202.

The light sensing device 202 may comprise one or more light sensing devices 202 or one or more arrays of light sensing devices 202, wherein the light sensing devices 202 are disposed at a location in the reflector 204 parallel to the second axis 222 or substantially orthogonal (e.g., within 10 degrees of being orthogonal) to the first axis 220. Furthermore, reflector housing 213 may comprise multiple openings 206, each opening allowing for positioning of one or more light sensing devices 202 oriented substantially orthogonal to the first axis 220.

The light sensing device 202 may be variously configured to detect radiant output, including being in electrical coupled with a reverse bias voltage or a transimpedance amplifier 275 and/or comparator. In another example, light sensing device 202 may be variously implemented to detect radiant output 24 (e.g., from light emitting devices 110), including through a bias potential scanning circuit. The transimpedance amplifier 275 may convert a (typically low) current signal from light sensing device 202, to an amplified voltage output signal, to increase the reliability and robustness of the digital or analog control circuitry. The gain of the amplifier may be determined by selection of feedback resistor 330, which may also determine the full-scale amplifier output voltage based on the input current from the photodetector 202. As an example, the feedback resistor 330 may be selected to achieve a full-scale voltage level of 4 volts (e.g., the amplifier output signal is 4 volts when a full-scale incident light is received at the light sensing device 202).

The one or more light sensing devices 202 may detect radiant output 24 produced from the light emitting device 110, including monitoring far-field illumination such as the radiant output delivered to the surface of the work piece 26, and the like. Thus, the radiant output 24 may include radiation emitted at a wavelength within the spectral band detectable by the light sensing device 202. The radiant output 24 detected at light sensing device 202 may be converted to an electrical current in a reverse-biased light sensing device 202 to monitor the radiant output. As such, the one or more light sensing devices 202 may be periodically polled by the controller 108 (e.g., a CPU 230, microcontroller, or other substitute device). Alternately or additionally, the data may be obtained by or provided to the controller 108, directly or indirectly (e.g., via coupling electronics 22), using an appropriate protocol or mechanism, and at a time or at times as comports with control of the application. Controller 108 may retain the data (whether as detected, or after conditioning or other processing as described above) in a data archival system residing at ROM 232, so as to monitor detected characteristics (e.g., radiant output 24, and the like as described above) over time. In this way, the integrity of the light emitting devices 110 may be continuously monitored with a higher precision, which may help determine the expected lifetime of the LED array 20 and reduce unexpected downtime of the lighting system 200. Furthermore, the ability to more reliably and more precisely monitor the integrity of the light emitting devices 110 may allow for a reduced redundancy in the design of the lighting system. For example, fewer light sensing devices 202 may be installed while maintaining the same downtime, thereby reducing manufacturing costs and time.

The light emitting devices 110 may be connected to the power source 102 via coupling electronics 22 comprising a circuit that monitors the photovoltaic current and applies a variable forward bias potential to the light emitting device 110 while sensing the current derived from light energy converted to electrical signals by one or more photo sensing surfaces of one or more photo sensing devices 202. The photovoltaic current and the forward bias potential can be calibrated to an external standard for the radiant output. The light emitting devices 110 may be connected to circuitry that allows them to be separately addressed either through a separate module or through circuitry integrated into the power supply. Moreover, the light sensing device 202 may electrically connected to a different circuit that applies to them a reverse electrical bias.

In some examples, a portion of the radiant output 24 may be reflected back to the LED array 20 having the light emitting devices 110 due to at least one reflective property of the work piece 26. This reflected light, termed retro-reflected light 260, may follow a general path as shown as the dotted arrowed lines in FIG. 2. Additional retro-reflected light may arise from a portion of radiant output 24 being reflected back towards the light emitting devices 110 from reflector 204 and from other external light sources. As discussed above, positioning the light sensing device 202 at an opening 206 of the reflector housing 213 aligned with the second axis 222 substantially orthogonal to the direction of light energy outputted by light emitting devices 110 in the first axis 220, reduces the amount retro-reflected light incident at light sensing surface 255. In this way, a more accurate determination of radiant output 24 may be measured by light sensing device 202. Furthermore, the data derived from the light sensing surface 255 may be used by controller 108 to adjust the power supply to one or more light emitting devices 110, thereby enabling more precise control of the lighting system 200 and increased performance in curing of work piece 26. In one example, a curing of the work piece 26 may be regulated via adjusting an intensity of light transmitted from the light emitting device 110. In another example, the curing of the work piece 26 may be adjusted via adjusting an exposure time of the work piece to light energy.

The radiant output may be measured by the photodiode by converting detected light energy into electrical signals (e.g., electrical current), which can then be received as data by the controller. In one example, a gain parameter of the light sensing device 202 is calibrated to output a voltage to the controller 108 using an appropriate feedback resistor in a basic transimpedance amplifier proportional and responsive to the detected radiant output current. Furthermore, the gain parameter may be calibrated based on a known relationship between a radiant output intensity or irradiance and the voltage output to the controller 108 corresponding to a specific application. Thus, calibration of the gain of the photodiode may be accomplished based on the measured light energy received by the light sensing devices. Further still, an amount of emitted light by the light emitting device may be adjusted to a desired level based on one or more measurements by the light sensing device 202. Monitoring of the light energy may also enable or enhance other lighting system controls, including adjustment(s) in applied power and cooling (such as through a systemic cooling system). Retro-reflected light received at the light sensing device 202 may serve to increase background noise relative to the signal based on the radiant output from the light emitting devices, In this way, the retro-reflected light can decrease a signal-to-noise ratio (SNR) by causing a signal measurement at the light sensing device 202 to be indicative of a higher than the actual output of emitted light. Accordingly, the configuration of lighting system 200, including a light sensing device being positioned along the second axis 222 substantially orthogonal to the first axis 220, may increase the signal-to-noise ratio (SNR), allow for a lower gain parameter, and increase performance by providing more precise control of the lighting system 200 for curing the work piece 26.

Operation of lighting system 200 may thus include detecting an amount of radiant output 24 at light sensing device 202, converting radiant output current signals to voltage via a transimpedance amplifier 275, and inputting the converted data to the inputs 236 of controller 108. Furthermore, responsive to the inputted data being indicative that light energy is insufficient at one or more locations associated with the work piece 26, the controller 108 may increase radiant output 24 from one or more of the light emitting devices 110 via executable instructions residing in ROM 232 through output 235. For example, the controller 108 may increase the power source's supply of power to one or more of the light emitting devices 110 to reduce under curing of work piece 26. In contrast, responsive to the inputted data being indicative that light energy is excessive at one or more locations associated with the work piece 26, the controller 108 may decrease radiant output 24 from one or more of the light emitting devices 110 via executable instructions residing in ROM 232 through output 235. For example, the controller 108 may decrease the power source's supply of power to one or more of the light emitting devices 110 to reduce over curing of work piece 26. Increasing and decreasing radiant output 24 may include increasing and decreasing a radiant output intensity and/or increasing and decreasing a radiant output duration, respectively.

Further still, selected of the light sensing devices 202 may be associated with monitoring radiant output from one or more respective light emitting devices 110, so that when radiant output measured in connection with these selected light emitting devices is different than desired, the controller 108 may control specific part(s) of the lighting system 200, for example a specific selection of the light emitting devices 110, to adjust the light emission locally to those specific light emitting devices 110. Moreover, a more general, overall systemic control strategy (e.g., to increase general cooling in balance with a general increase in power to all light emitting devices 110) approach may be implemented as well, depending on the particular application.

Turning now to FIG. 3, it illustrates an example circuit diagram of a transimpedance amplifier 275 for monitoring photovoltaic current from a light sensing device 202 and applying a bias potential to the photovoltaic current. More specifically, in this embodiment, a reference voltage measured by the light sensing device 202 may indicate an amount of power derived power source 102 to one or more components of a light emitting subsystem 12, as shown in FIG. 1. The power source 102 may be implemented as a constant current programmable power supply outputting a current (I). The power source 102 may be controlled by a controller 108. Here, the signal input to the controller 108 from the transimpedance amplifier 275 may be based on a user-predetermined adjustment mechanism (e.g., a variable feedback resistor 330, which may be calibrated to provide a desired radiant output level), and an operational amplifier 320. In one example, coupling electronics 22 may comprise the transimpedance amplifier 275.

The operational amplifier 320 may be configured to receive the photocurrent signal of the light sensing device 202. The amplifier's non-inverting input (+) 328 may be grounded while the operational amplifier's inverting input (−) 324 may be coupled to light sensing device 202, as well as to a variable feedback resistor (Rf) 330. As such, the inverting input 324 may serve as a virtual ground.

As shown in the example circuit diagram of FIG. 3, the photocurrent from the light sensing device 202 may be driven into the virtual ground inverting input 324. In this way, light sensing device 202 may operate in a photovoltaic mode, rather than a reverse-biased mode. Operation in the photovoltaic mode may provide for a substantially higher degree of output linearity relative to the input signal. Accordingly, the output potential from operational amplifier 320 may be determined from the relationship $Vo=-I*Rf$, where Vo is the output voltage of operational amplifier 320, I is the photocurrent signal from the light sensing device, and Rf is the resistance of the variable feedback resistor 330. In one example, the gain parameter may be calibrated to a full-scale output voltage of 4V. Calibration may be based on empirical irradiance data from the lighting system 200. In this way, the resistance of variable feedback resistor 330 may set the gain parameter of lighting system 200. Calibration of the gain parameter (e.g., resistance of variable feedback resistor) may be affected by retro-reflected light received by one or more light sensing surfaces 255 of light sensing devices 202. For example, retro-reflected light 260 detected at light sensing device 202 may increase the overall signal received from light sensing device 202, the retro-reflected light 260 serving as noise to the signal from measured radiant output 24 at light sensing device 202. In this way retro-reflected light 260 incident at light sensing device 202 may decrease a signal-to-noise ratio of the light sensing device 202 and result in calibration of a higher gain parameter. Accordingly, by using a lighting system 200, comprising a light sensing device 202 oriented along a second axis 222 substantially perpendicular to a first axis 220, detection of retro-reflected light at the light sensing device 202 may reduce, thereby increasing SNR and lowering a gain parameter.

A power source 102 may be operated in direct current (DC) mode (e.g., continuously on), and may be used to charge a capacitor 310 to a voltage at a level similar to or higher than the voltage of the light emitting device 110. In this way, capacitor 310 may suppress unwanted high-frequency noise that may persist at low input current (e.g., current) levels from the light sensing device 202. In the absence of capacitor 310, higher frequency noise or oscillations may be amplified and would result in a noisy output control signal from power source 102 in controlling light emitting device 110. In suppressing noise, capacitor 310 may thus aid in increasing reliability and robustness of the lighting system 200 by providing a clearer and cleaner amplified output voltage signal from power source 102 to any downstream digital (logic) or analog control circuits or components receiving output from controller 108. The capacitor 310 may be connected in parallel with the light emitting device 110, the capacitor 310 being in parallel with the series combination of the light emitting device 110 and the parallel connected variable feedback resistor 330.

The power source 102 may be configured as a constant current power supply, wherein controller 108 may adjust an output current of the power source 102 to maintain a desired radiant output from the light emitting device 110. The controller 108 may compare Vo to a desired set voltage in controlling output current from the power source 102 to the light emitting device 110.

As another example, separate circuits, each corresponding to one of a plurality of transimpedance amplifiers 275, can be used for measuring signals from a plurality of light sensing devices 202. As another example, rather than using light sensing devices 202 in the photovoltaic mode and measuring using a transimpedance amplifier 275, one or more of the light sensing devices 202 may be reverse biased and measurements may be taken of the voltage across a bias resistor in order to determine the photocurrent and, accordingly, control the lighting system 200.

In this manner, a lighting system may comprise: a light emitting device oriented to emit light energy principally along a first axis for curing a light-curable work piece; a light sensing device oriented along a second axis substantially orthogonal to the first axis for measuring the light energy emitted from the light emitting device; and a controller, including non-transitory executable instructions to adjust the curing of the light-curable work piece in response to the measured light energy. Additionally or alternatively, the second axis may be substantially orthogonal to the first axis comprises the second axis being within 10 degrees of being orthogonal to the first axis. Additionally or alternatively, the non-transitory executable instructions to adjust the curing of the light-curable work piece may comprise adjusting an intensity of light supplied from the light emitting device. Additionally or alternatively, the non-transitory executable instructions to adjust the curing of the light-curable work piece may comprise adjusting a duration the light-curable work piece is irradiated with light supplied from the light emitting device. Additionally or alternatively, the lighting system may comprise a reflecting surface positioned between the light emitting device and the light-curable work piece, wherein the light sensing device is positioned at the reflecting surface. Additionally or alternatively, the lighting system may comprise a refracting lens positioned between the reflecting surface and the light-curable work piece. Additionally or alternatively, the lighting system may comprise a transimpedance amplifier electrically coupled between the light sensing device and the controller.

FIG. 4 shows a flow chart for an example method 400 for operating a lighting system 200. Method 400 may comprise non-transitory executable instructions executed by a controller such as controller 108 for operating lighting system 200. Method 400 begins at 410 where light energy may be supplied to a work piece 26 principally along a first axis 220 via one or more light emitting devices 110. The light emitting devices 110 may be one or more LEDs, or one or more arrays of LEDs. Supplying light energy principally along the first axis 220 may include supplying light energy principally in a direction parallel to the first axis 220. The first axis 220 may coincide or be parallel to an optical axis of the lighting system 200. For example, one or more of the light emitting devices 110, reflector 204, and refracting lens 250 may be positioned to have rotational symmetry about the first axis 220.

Method 400 continues at 420 where the supplied light energy is reflected and/or collimated at a reflecting surface 218 of reflector 204 positioned between light emitting devices 110 and a work piece 26. As described above, reflector 204 may comprise an elliptic cylindrical reflector, parabolic reflector, dual elliptic cylindrical reflector, tapered reflector, and the like. Furthermore, the reflecting surface 218 reflector 204 may comprise one of a total internal reflection (TIR) surface, a metal surface, a dielectric surface, a faceted surface, or some combination thereof. The reflecting surface 218 may also have the ability to combine radiant output of multiple wavelengths that may be emitted from multiple light emitting devices into a homogeneously mixed beam of light. Collimating and/or reflecting the supplied light energy may include collimating and/or reflecting the light along or in a direction parallel to the first axis 220 towards the work piece 26. In this way, reflecting surface 218 may aid in reducing an amount of retro-reflected light 260 incident at the light sensing device 202.

Method 400 continues at 430 where the supplied light energy may be collimated by a refracting lens 250 positioned between the reflecting surface 218 of reflector 204 and the work piece 26. As described above, refracting lens 250 may comprise various types of lenses including a cylindrical lens, a Fresnel lens, and the like. Furthermore, refracting lens 250 may be arranged as one or more arrays of lens elements. Refracting lens 250 may enable collimation of at least a portion of the radiation output from the light emitting devices 110 so that the radiation output is oriented principally in a direction parallel to the first axis 220. Accordingly, both the radiation output intensity incident at the work piece 26 and the resultant curing of work piece 26 may have increased uniformity. Furthermore, refracting lens 250 may also advantageously collimate retro-reflected light 260 from work piece 26, thereby orienting the retro-reflected light 260 principally in a direction parallel to the first axis 220 back towards the light emitting devices 110. In this way, an amount of retro-reflected light 260 incident at a light sensing surface 255 of the light sensing device 202 may be further reduced.

At 440, method 400 measures light energy at a light sensing device 202 oriented along a second axis 222 and positioned at the reflecting surface 218. The light sensing device 202 may comprise a photodiode, wherein incident light at a light sensing surface 255 of light sensing device 202 may generate a photocurrent. Orienting the light sensing device 202 along a second axis 222 may comprise positioning or mounting the light sensing device 202 in an opening 206 of a reflector housing 213, wherein the opening 206 is constructed so as to position the light sensing device 202 substantially orthogonal to the first axis 220. Furthermore, a light sensing surface 255 of the light sensing device 202 may be directed along the second axis 222. Positioning the light sensing surface 255 at the reflecting surface 218 may comprise positioning the light sensing surface 255 flush with the reflecting surface 218 or may comprise positioning the light sensing surface 255 slightly recessed from the reflecting surface 218.

At 446, method 400 continues by amplifying the photocurrent signal generated by incident light at the light sensing surface 255 via a transimpedance amplifier 275 electrically coupled between the light sensing device and the controller 108. The amplified signal is then output to the controller 108. Amplifying the photocurrent signal may comprise applying a bias potential and converting the photocurrent signal to a voltage potential via a gain parameter at the transimpedance amplifier 275. As described above with reference to the example of FIG. 3, the gain parameter may be a user-calibrated parameter set as the resistance of a variable feedback resistor.

Method 400 continues at 450 where it determines if a difference between the measured light energy at light sensing device 202 and a target light energy is greater than a threshold difference. The target light energy may correspond to a desired light energy intensity, irradiance, or duration for curing work piece 26. In one example, the desired light energy may be input as a set point to controller 108 for controlling lighting system 200. When the difference between the measured light energy at light sensing device 202 and a target light energy (e.g., controller error signal) is greater than a threshold difference, the controller 108 may execute control actions to reduce the controller error signal. At 454 method 400 may adjust intensity of supplied light energy in response to the difference between the measured and target light energy. For example, if the measured light energy is greater than a target light energy, controller 108 may reduce a voltage supplied from power source 102 to one or more light emitting devices 110, thereby reducing an amount of radiant output intensity from the light emitting devices 110. As another example, if the measured light energy is less than a target light energy, controller 108 may increase a voltage supplied from power source 102 to one or more light emitting devices 110, thereby increasing an amount of radiant output intensity from the light emitting devices 110.

Alternately, or in addition to adjusting the intensity of the supplied light energy at 454, method 400 may adjust an exposure time of work piece 26 to supplied light energy in response to the difference between the measured and target light energy. For example, if the measured light energy is greater than a target light energy, controller 108 may reduce a duration that voltage is supplied from power source 102 to one or more light emitting devices 110, thereby reducing a duration that radiant output 24 is emitted from the light emitting devices 110 to cure work piece 26. As another example, if the measured light energy is less than a target light energy, controller 108 may increase a duration that voltage is supplied from power source 102 to one or more light emitting devices 110, thereby increasing an duration that radiant output 24 is emitted from the light emitting devices 110 to cure work piece 26. After 458, and after 450 when the difference between the measured and target light energy is not greater than the threshold difference, method 400 ends.

In this manner, a method may comprise: supplying light energy from a light emitting device principally along a first axis; sensing the light energy with a light sensing device oriented along a second axis, wherein the second axis is oriented substantially orthogonally to the first axis; and adjusting the light energy in response to the sensed light energy. Additionally or alternatively, orienting the second axis substantially orthogonally to the first axis may comprise orienting the second axis to within 10 degrees of being orthogonal to the first axis. Additionally or alternatively, sensing the light energy with the light sensing device may comprise sensing the light energy with a photodiode oriented along the second axis. Additionally or alternatively, the method may comprise supplying the light energy to a work piece, and collimating the light energy via a reflecting surface positioned between the light emitting device and the work piece. Additionally or alternatively, the method may comprise positioning the light sensing device at the reflecting surface, wherein a light sensing surface of the light sensing device is positioned flush with the reflecting surface. Additionally or alternatively, the method may comprise positioning the light sensing device at the reflecting surface, wherein a light sensing surface of the light sensing device is recessed from the reflecting surface. Additionally or alternatively, the method may comprise collimating the light energy via a refracting lens positioned between the reflecting surface and the work piece. Additionally or alternatively, adjusting the light energy in response to the sensed light energy comprises adjusting the light energy in response to a difference between the sensed light energy and a target light energy being greater than a threshold difference.

In another example, a method may comprise: supplying light energy from a light emitting device along a first axis to a light-curable work piece; sensing the light energy via a light sensing device oriented along a second axis substantially orthogonal to the first axis; and adjusting a curing of the light-curable work piece in response to the sensed light energy. Additionally or alternatively, the method may comprise outputting a signal from the light sensing device to a controller based on the sensed light energy, wherein adjusting the curing of the light-curable work piece in response to the sensed light energy comprises adjusting the light energy supplied by the light emitting device via the controller in response to the output signal. Additionally or alternatively, the method may comprise amplifying the output signal via a transimpedance amplifier electrically coupled between the light sensing device and the light emitting device controller. Additionally or alternatively, adjusting the light energy supplied by the light emitting device may comprise adjusting a current supplied to the light emitting device. Additionally or alternatively, amplifying the output signal via the transimpedance amplifier may comprise amplifying a photocurrent output from the light sensing device by applying a bias potential via the transimpedance amplifier.

In this way, a method comprising: supplying light energy from a light emitting device principally along a first axis; sensing the light energy with a light sensing device oriented along a second axis, wherein the second axis is oriented substantially orthogonally to the first axis; and adjusting the light energy in response to the sensed light energy can achieve a technical effect of reducing an amount of retro-reflected light incident at the light sensing device, reducing measurement error of the light sensing device, and increasing control precision and overall performance of the lighting system for curing a work piece can be achieved. Furthermore, the integrity of the light emitting devices may be continuously monitored with more precision, which may help determine an expected lifetime of light emitting devices, and thereby reduce unexpected downtime of the lighting system. Furthermore, the ability to more reliably and precisely monitor the integrity of the light emitting devices may allow for a reduced redundancy in the design of the lighting system. For example, fewer light sensing devices may be installed while maintaining the same downtime, thereby reducing manufacturing costs and time.

Note that the example control and estimation routines included herein can be used with various lighting system configurations. The control methods and routines disclosed herein may be stored as executable instructions in non-transitory memory and may be carried out by the control system including the controller in combination with the various sensors, actuators, and other lighting system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the lighting system, where the described actions are carried out by executing the instructions in a system including the various lighting hardware components in combination with the controller The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

supplying light energy from a light emitting device principally along a first axis to a work piece;

orienting retro-reflected light along the first axis toward the light emitting device, wherein the retro-reflected light is reflected from the work piece, a reflective surface of a reflector, or a refracting lens;

collimating the light energy via a surface positioned between the light emitting device and the work piece;

sensing the light energy with a light sensing device oriented along a second axis, wherein the second axis is oriented orthogonally to the first axis; and adjusting the light energy in response to the sensed light energy;

wherein the light sensing device is within an opening in a wall of a reflector housing, and wherein the opening in the wall of the reflector housing is between the light emitting device and the refracting lens.

2. The method of claim 1, wherein orienting the second axis orthogonally to the first axis comprises orienting the second axis to within 10 degrees of being orthogonal to the first axis.

3. The method of claim 2, wherein sensing the light energy with the light sensing device comprises sensing the light energy with a photodiode oriented along the second axis.

4. The method of claim 1, further comprising positioning the light sensing device at the surface, wherein a light sensing surface of the light sensing device is positioned flush with the surface.

5. The method of claim 1, further comprising positioning the light sensing device at the surface, wherein a light sensing surface of the light sensing device is recessed from the surface.

6. The method of claim 4, further comprising collimating the light energy via a lens positioned between the surface and the work piece.

7. The method of claim 6, wherein adjusting the light energy in response to the sensed light energy comprises adjusting the light energy in response to a difference between the sensed light energy and a target light energy being greater than a threshold difference.

8. A method, comprising:

supplying light energy from a light emitting device along a first axis to a light-curable work piece;

orienting retro-reflected light along the first axis toward the light emitting device, wherein the retro-reflected light is reflected from the work piece, a reflective surface of a reflector, or a refracting lens;

collimating the light energy via a surface positioned between the light emitting device and the light-curable work piece;

sensing the light energy via a light sensing device located within a wall of a reflector housing between the light emitting device and the refracting lens and oriented along a second axis orthogonal to the first axis, wherein the refracting lens is located at a distal end of the reflector housing; and adjusting a curing of the light-curable work piece in response to the sensed light energy.

9. The method of claim 8, further comprising outputting a signal from the light sensing device to a controller based on the sensed light energy, wherein adjusting the curing of the light-curable work piece in response to the sensed light energy comprises adjusting the light energy supplied by the light emitting device via the controller in response to the output signal.

10. The method of claim 9, further comprising amplifying the output signal via a transimpedance amplifier electrically coupled between the light sensing device and the controller.

11. The method of claim 10, wherein adjusting the light energy supplied by the light emitting device comprises adjusting a current supplied to the light emitting device.

12. The method of claim 11, wherein amplifying the output signal via the transimpedance amplifier comprises amplifying a photocurrent output from the light sensing device by applying a bias potential via the transimpedance amplifier.

13. A lighting system, comprising:

a light emitting device oriented to emit light energy principally along a first axis for curing a light-curable work piece;

a light sensing device oriented along a second axis orthogonal to the first axis for measuring the light energy emitted from the light emitting device, wherein the light sensing device is within an opening in a wall of a reflector housing, wherein the opening in the wall of the reflector housing is between the light emitting device and a refracting lens, and wherein the refracting lens is mounted at a distal end of the reflector housing;

orienting retro-reflected light along the first axis toward the light emitting device, wherein the retro-reflected light is reflected from the light-curable work piece, a reflective surface of a reflector, or the refracting lens;

collimating the light energy via a surface positioned between the light emitting device and the light-curable work piece; and a controller, including non-transitory executable instructions to adjust curing of the light-curable work piece in response to the measured light energy.

14. The lighting system of claim 13, wherein the second axis being orthogonal to the first axis comprises the second axis being within 10 degrees of being orthogonal to the first axis.

15. The lighting system of claim 14, wherein adjusting the curing of the light-curable work piece comprises adjusting an intensity of light supplied from the light emitting device.

16. The lighting system of claim 15, wherein adjusting the curing of the light-curable work piece comprises adjusting a duration the light-curable work piece is irradiated with light supplied from the light emitting device.

17. The lighting system of claim 16, wherein the light sensing device is positioned at the surface.

18. The lighting system of claim 17, further comprising a lens positioned between the surface and the light-curable work piece.

19. The lighting system of claim 18, further comprising a transimpedance amplifier electrically coupled between the light sensing device and the controller.

* * * * *